United States Patent [19]

Ten Angel

[11] Patent Number: 4,641,769
[45] Date of Patent: Feb. 10, 1987

[54] FOLDING ROOF RACK FOR CARS

[76] Inventor: Salvador Ten Angel, Juan Bravo 16, 40001-Segovia, Spain

[21] Appl. No.: 847,132

[22] Filed: Apr. 1, 1986

Related U.S. Application Data

[63] Continuation of Ser. No. 625,536, Jul. 19, 1984, abandoned.

[30] Foreign Application Priority Data

Jul. 27, 1983 [ES] Spain .................................... 273778

[51] Int. Cl.⁴ .............................................. B60R 9/04
[52] U.S. Cl. .................................. 224/314; 224/320
[58] Field of Search ............... 224/314, 309, 325, 320

[56] References Cited

U.S. PATENT DOCUMENTS

| | | | |
|---|---|---|---|
| 2,387,779 | 10/1945 | Strauss | 224/314 |
| 3,899,110 | 8/1975 | Binding et al. | 224/314 |

FOREIGN PATENT DOCUMENTS

| | | | |
|---|---|---|---|
| 515957 | 12/1952 | Belgium | 224/314 |
| 922235 | 6/1947 | France | 224/314 |
| 1091531 | 4/1955 | France | 224/325 |
| 536800 | 12/1955 | Italy | 224/325 |
| 114633 | 9/1980 | Japan | 224/314 |

Primary Examiner—Stephen Marcus
Assistant Examiner—Robert M. Petrik
Attorney, Agent, or Firm—Frishauf, Holtz, Goodman & Woodward

[57] ABSTRACT

A folding car rack having first and second rigid side members each of which has first and second ends. The roof rack also includes first and second rigid end members, each of which has first and second ends. A first articulated joint connects the first end of the first side member to the first end of the first end member. A second articulated joint connects the first end of the second side member to the first end of the second end member. A first separable connector temporarily joins the second end of the second end member to the second end of the first side member when the roof rack is being used. A second separable connector temporarily joins the second end of the first end member to the second end of the second side member when the roof rack is being used. A plurality of cargo support members having ends which are articulated to the first and second side members are also articulated approximately midway between their ends.

5 Claims, 5 Drawing Figures

FOLDING ROOF RACK FOR CARS

This application is a continuation of application Ser. No. 625,536, filed July 19, 1984, now abandoned.

BACKGROUND OF THE INVENTION

This invention is a folding luggage rack for cars, having a simple structure which allows easy assembly and disassembly, giving it an advantage over other types of luggage racks.

The problems and inconveniences caused by using luggage racks on cars is a well known fact, no matter what their design or structure. The ones which are known as "fixed" are the most useful, giving the car more capacity for transporting luggage etc. but as they cannot be folded away they must remain permanent on the roof, so spoiling the general aspect of the car and creating difficulty for cleaning the car roof. There again when this type of roof rack is taken off, the problem is where to store it; in many cases people keep them in their houses or garages, should the occasion arises it isn't at hand.

Another type of roof rack consists of separate metal bars which are screwed onto the car roof. This type of rack has the disadvantage that anything which is placed on it must have a solid base so that it rests on the bars and not on the car roof, that way it would deteriorate the paintwork of the car; also anything which is narrower than the separation of the bars cannot be carried on the rack, neither can this type of roof rack be stored in the boot of the car because of its dimensions. Also this model is very unstable and anything carried on it must be held in place by ropes or elastic cords.

As a consequence of the above mentioned inconveniences the invention proportions a roof rack which on one hand offers the utility and functions of the other types of racks, and on the other hand can be folded away for storage in the boot of the car, in the same way as one keeps tools, also its assembly and disassembly is rapid and easy.

BRIEF DESCRIPTION OF THE INVENTION

The basic structure of the roof rack consists of four "U" shaped sections, these are joined together at their ends so making a frame. Between the two inner sections of two of the "U" shaped sections there are articulated metal strips, while the outer sections are connected to the inner ones by hinges; accomplishing the articulation of the frame as two opposite diagonal vertexes. In order to fold the frame it is done by doubling the metal strips until the outer sections are superposed and fitted into their grooves. When folded, the rack has a narrow rectangular shape the width of the two side sections, the rack is held in place on the car roof by incorporated tensors.

THE DRAWINGS

In order to facilitate a better understanding of the invention the following points can be taken into consideration as well as the enclosed drawings as a general orientation.

Figure 3:
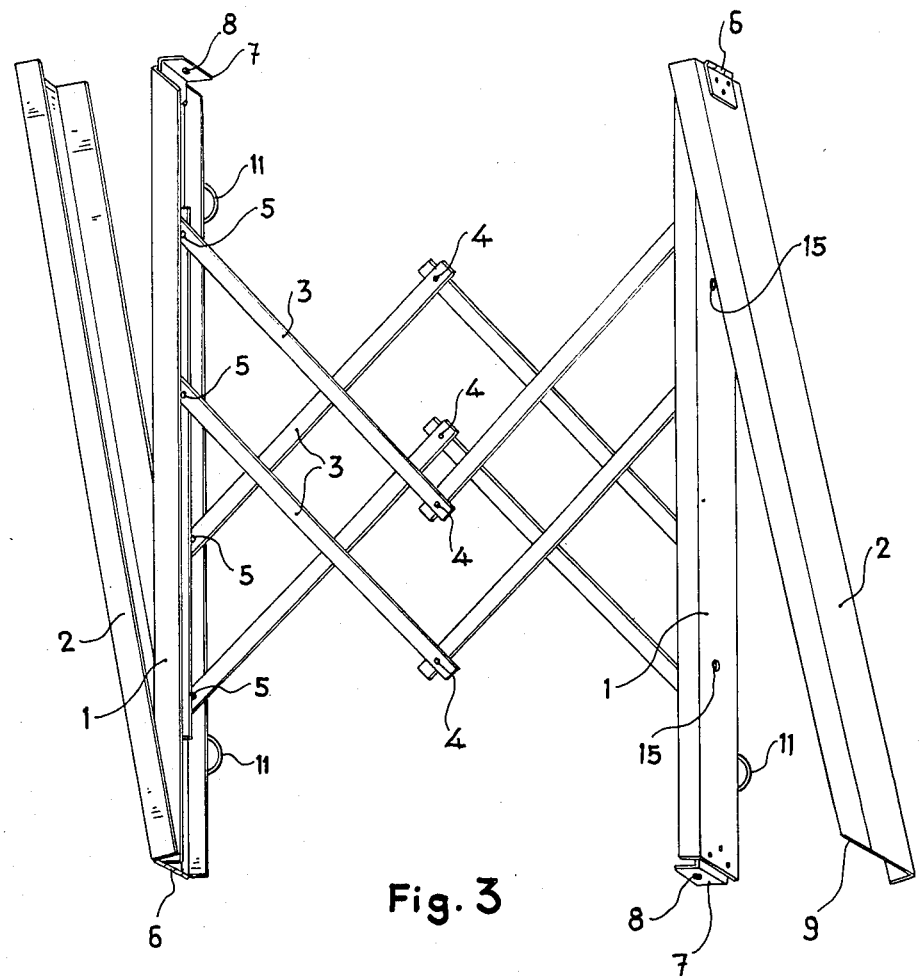

FIG. 3 also shows another view of the roof rack while being doubled.

Figures 1, 4:
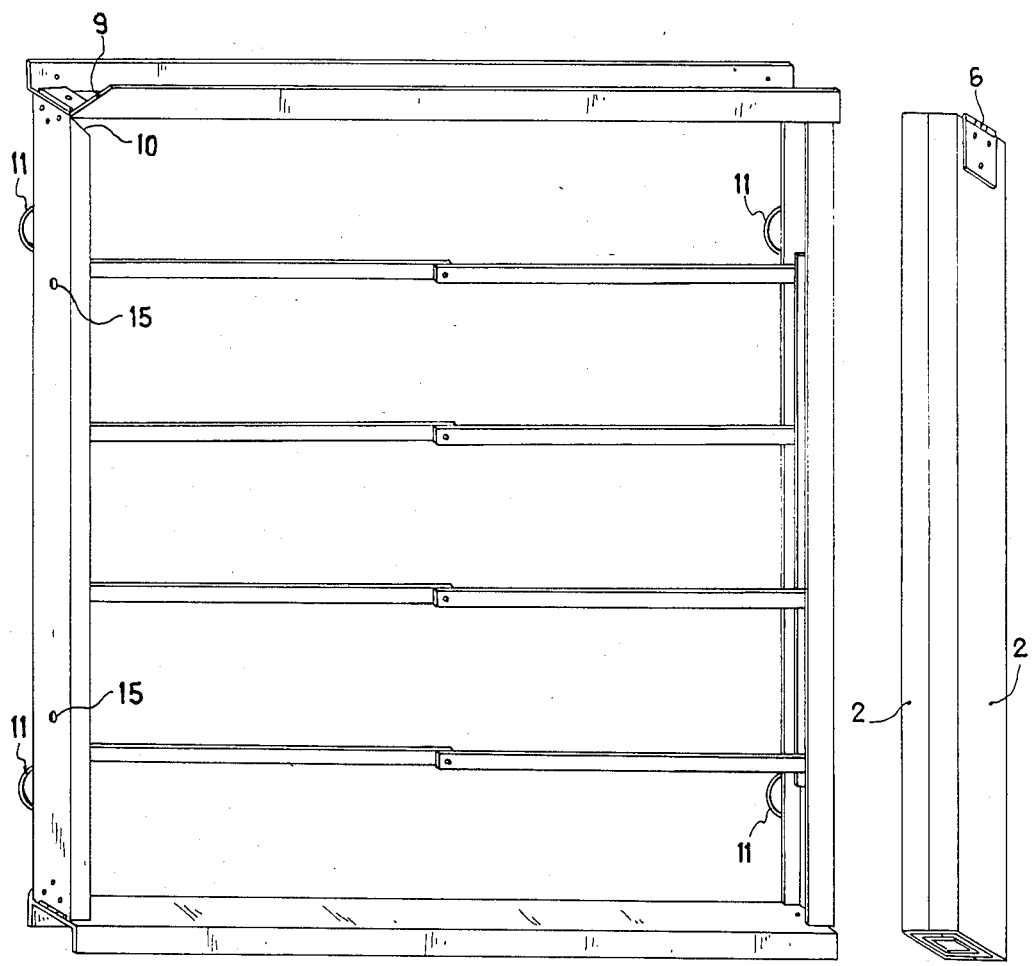
FIG. 1 shows the roof rack open as on top of the car roof.
Figure 2:
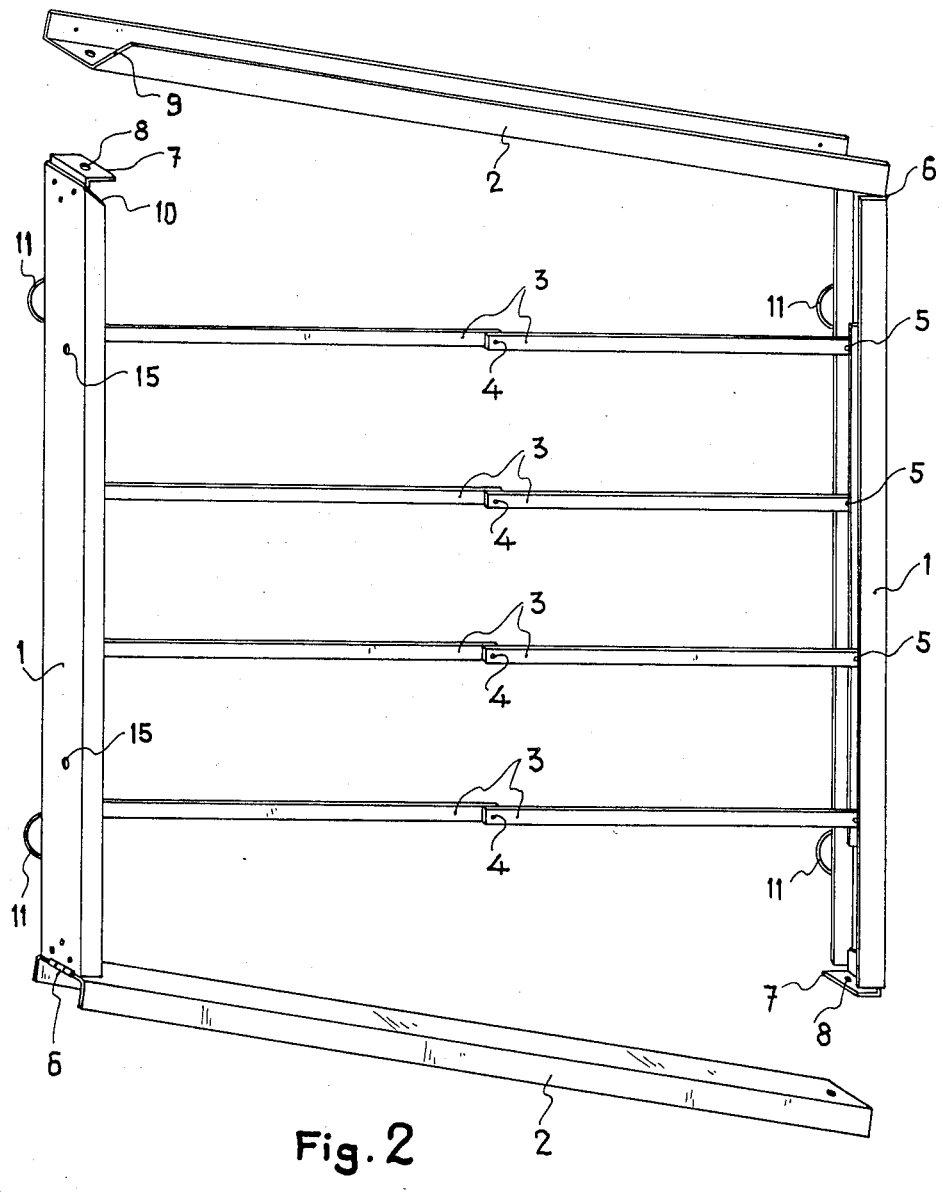
FIG. 2 shows the roof rack in the initial position of being doubled.

FIG. 4 shows the roof rack completely folded.

Figure 5:
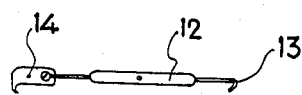

FIG. 5 shows one of the tension devices used for fixing the rack to the car roof.

DETAILED DESCRIPTION OF THE INVENTION

The following numerical references correspond to the parts and elements of the above mentioned figures:

1. Fixed inner sections in closed position.
2. Outer articulated sections in closed position.
3. Articulated metal strips between the inner side sections.
4. Central articulation of the metal strips (3).
5. The extreme ends of the metal strips (3).
6. Articulation of one of the ends of the outer sections showing the hinge.
7. Joint at the open end of the fixed inner side section (1)
8. Protective rubber stops in case of the rack being heavily loaded.
9. A 30° angle cross section view of the inner side of the outer section (2).
10. A 45° angle cross section view of the end of the inner side of the side section (1).
11. Supporting rubber stops.
12. Tensor
13. Hook for the tensor (12)
14. Metal piece of the tensor for fixing to the car roof
15. Openings in the fixed inner side sections (1) for the tensor hooks (12).

As seen in the mentioned figures, the roof rack consists mainly of two pairs of "U" shaped side sections (1) and (2) forming a frame which can be square or rectangular. The inner side sections (1) form the two opposite sides of the frame, while the other two outer side sections (2) form the other two sides. Between the two inner side sections (1) are articulated metal strips (3), these determine the amount of space for the luggage. Each one of these pieces are made up of two metal strips with a central articulation (4), while their ends are articulated to each one of the inner fixed sections (1), as indicated in the numerical reference (5), so determining the central and extreme articulations of each metal strip (3) and the rotation axis for assembly and disassembly. Each pair of metal strips can be compared with two links in a chain, in which when the roof rack is installed on the car roof, the action of the tensors also makes the "chain" tense, so that even when the rack is loaded it never touches the car roof; and in the event that the rack should be heavily loaded the metal strips are provided with small rubber stops at their ends so avoiding at all times direct contact with the car roof. This is an advantage over other conventional roof racks which with time bend and deteriorate the car roof.

With regard to the outer side sections (2) they are articulated at one of their extreme ends to the inner side section (1) by hinges (6) so forming two opposite diagonal vertexes which make up the frame.

The open ends of the inner section (1), that is to say, the end contrary to the articulated ends, have an angular metal plate connected to the inside of the section while the other side of the metal plate is perpendicular to the inside of the section (1). One of the open ends of the outer section (2) has a 30° angle cutting on its lateral side (9) and the other end of the inner side section (1) has been cut at an angle of 45° (10), so facilitating the union of the two pieces.

The union of the two pieces is effected the following way:

The vertex which hasn't a 45° angle cutting is adjusted first.
The structure is then made into a diamond shape.
The opposite vertex is then adjusted.
A rectangular shape is then made.

The inner side sections (1) are fitted with rubber stops (11) in order to protect the car roof, these protective stops have a prismatic shape, so that when the roof rack is open the ends of the stops plug into the openings in the inner side section (1) and when the rack is in a closed position the rubber stops fit next to one another, so that in a closed position the rack has the shape of a prismatic bar, the tensors and the stops are completely inside.

When the roof rack is open, i.e. the metal strips (3) extended and the inner and outer side sections (1) and (2) adjusted together the rack is placed on the roof with the rubber stops downwards.

The metal strips are considered as the base for the luggage to be carried, the rack is fastened to the roof of the car by means of tensors (12) from one joint to the openings (15) while the other end of the tensor has a curved metal plate in order to adjust it to the car roof, the tensors are fitted with screws which simultaneously screw in both directions so making the assembly quick and not presenting any difficulty for the user.

In order to fold the rack the tensors (12) have to be slackened and taken away from the frame, then the frame is made into a diamond shape and the open ends of the frame (1) and (2) of the frame disconnected, the metal strips (3) double until the side sections are facing one another until they are completely superposed, so making a rectangular shape the length of the inner and outer section (1) and (2) as shown in FIG. (4).

The described roof rack is essentially as in the figures; nevertheless as from a production point of view the following points can be taken into consideration.

(a) The inner and outer side sections in "U" shape (1) and (2) can be of aluminium or iron sheeting with a zinc coating, according to the desired cost.
(b) The metal strips (3) can be made of iron or a special aluminium alloy, so decreasing their weight. Should the case be that they are not of aluminium it would be advisable that they be of carbon steel being pliable enough to recuperate their original form when they are not loaded. Their thickness could be 1.50 mm instead of 4 mm and also have three or four pairs of strips (as seen in the figures).
(c) The protective rubber stops (11) should be all in one piece in order to be effective when plugged into the openings in the inner side sections (1). The rubber stops connect to the car roof by suction.
(d) The tensor hooks which fasten onto the car roof should have small curved protective rubber stops so preventing the hooks touching the roof directly.
(e) The hinges can be an adjoining part of the "U" sections (1) and (2) when these are of iron plating and not aluminium. For this a special mold is needed to cut the metal sections, once doubled and rivited the hinges are completed.
(f) An Adequate length of the rack when folded would be 1 meter instead of 0.90 cms and so it can be used for any car width, thus establishing two different lengths of tensors (one for small to medium sized cars and the other for medium to large sized cars.
(g) Also, two models of roof racks can be adopted, one of 0.95 cms and one of 1.05 cms for the two ranges of cars.
(h) When the roof rack is placed on the car roof and loaded, the metal strips (3) curve downwards and if the load is heavy they come to rest on the car roof but this is protected by the rubber stops. These rubber stops should measure apprx. 25 mm in diameter having a suction base and a spindle at the top to fit into its corresponding metal strip.

What is claimed is:
1. A folding car roof rack comprising:
(a) first and second rigid side members of channel shape, each having first and second ends;
(b) first and second rigid end members, each of which has at least one elongate flat surface and first and second ends;
(c) a first articulated joint connecting the first ends of said first side and first end members in such a way that first end member can swing by 270 degrees about said first end of said first side member from a first position in which said flat surface of said first end member is parallel and close to the outer bottom surface of said first channel shaped side member to a second position in which said first end member forms a right angle with said first side member;
(d) a second articulated joint connecting the first ends of said second side and second end members in such a way that said second end member can swing by 270 degrees about said first end of said second side member from a first position in which said flat surface of said second end member is parallel and close to the outer bottom surface of said second channel shaped side member to a second position in which said second end member forms a right angle with said second side member;
(e) first separable fastening means for securing the second ends of said first side and second end members together while said roof rack is in use and said second end member is in said first position thereof relative to said first side member;
(f) second separable fastening means for securing the second ends of said second side and first end members together while said roof rack is in use and said first end member is in said second position thereof relative to said second side member; and
(g) a plurality of cargo support members, each cargo support member being articulated approximately midway between its ends and having ends which are respectively articulated to said first and second side members in such a manner that the open sides of said channel shaped side members face each other and each cargo support member can fold up, without interference with any other cargo support member, within a box-like split tube formed by said facing side members brought close to each other, when said separable fastening means are separated for placing said end members in their respective first positions.

2. The folding car roof rack of claim 1, wherein said first and second rigid end members are also of channel shape and are wider than the first and second side members, so that in said first positions of said end members said first and second side members are each received within the channel shape of the respective first and second end members to which they are articulated when the roof rack is placed in its folded condition.

3. The folding car roof rack of claim 1, wherein said first and second articulated joints are provided by hinges and wherein said first and second separable connector members are provided by angle plates which are fixed to the second ends of said first and second side members and which protrude slightly from the second ends thereof to define channels for receiving the second ends of said first and second end members.

4. The folding car roof rack of claim 1, wherein said first and second articulated joints are provided by hinges and wherein said first and second separable connector members are provided by angular plates which are fixed to the second ends of said first and second side members and which protrude slightly from the second ends thereof to define channels for receiving the second ends of said first and second end members.

5. A folding car roof rack comprising:
   (a) first and second rigid side members of channel shape;
   (b) a plurality of elongate flat strip cargo support members, each cargo support member being articulated approximately between its ends and having ends which are respectively articulated to said first and second side members in such a manner that the open sides of said channel shaped side members face each other and each cargo support member can fold up, without interference with any other cargo support member, within a box-like split tube formed by said facing side members brought close to each other;
   (c) first and second rigid elongate spacing members each articulated at a first end thereof to one of said side members for swinging from a position flat against the side member to which it is articulated to a position in which a second end of the spacing member can be demountably attached to the other of said side members for spacing said side members from each other; and
   (d) means for demountably attaching said second end of each said spacing member to a said side member.

* * * * *